United States Patent [19]
Wada et al.

[11] Patent Number: 5,404,960
[45] Date of Patent: Apr. 11, 1995

[54] MOTOR-DRIVEN POWER STEERING APPARATUS FOR AUTOMOBILES

[75] Inventors: Shunichi Wada; Kazuhisa Nishino, both of Himeji, Japan

[73] Assignee: Mitsubishi Denki Kabushiki Kaisha, Tokyo, Japan

[21] Appl. No.: 187,340

[22] Filed: Jan. 25, 1994

[30] Foreign Application Priority Data

Jan. 27, 1993 [JP] Japan .................................. 5-011799

[51] Int. Cl.⁶ ............................................. B62D 5/04
[52] U.S. Cl. .................... 180/79.1; 364/424.05
[58] Field of Search ............................. 180/79.1, 142; 364/424.05

[56] References Cited

U.S. PATENT DOCUMENTS

| | | | |
|---|---|---|---|
| 4,754,828 | 7/1988 | Morishita et al. | |
| 4,754,829 | 7/1988 | Shimizu | 180/79.1 |
| 5,053,966 | 10/1991 | Tahahashi et al. | 180/79.1 X |
| 5,253,725 | 10/1993 | Nishimoto | 180/79.1 |
| 5,303,156 | 4/1994 | Matsuoka et al. | 180/79.1 |

Primary Examiner—Margaret A. Focarino
Assistant Examiner—Victor E. Johnson
Attorney, Agent, or Firm—Sughrue, Mion, Zinn, Macpeak & Seas

[57] ABSTRACT

A motor-driven type power steering apparatus for assisting a driver in manipulating a steering wheel of a motor vehicle includes a steering-wheel return state decision circuit for deciding whether the steering wheel is in the state to be returned to a center position, a control quantity generating and selecting circuit for generating control quantities corresponding to respective driving modes on the basis of a control quantity of the electric motor and selecting one of the control quantities in dependence on the result of the decision made as to the return state of the steering wheel, and a conversion circuit for converting the control quantities into PWM duty ratios, respectively. In the normal steering operation, switching elements for energizing the motor are driven with the PWM duty ratio corresponding to a first driving mode, while upon return of the steering wheel to the center position, the switching elements are driven with the PWM duty ratio corresponding to a second driving mode. A smooth steering torque control is realized with the steering-wheel return characteristic being improved.

6 Claims, 5 Drawing Sheets

(a) FIRST DRIVING MODE (b) SECOND DRIVING MODE

FIG. 6(a)
FIRST DRIVING MODE

FIG. 6(b)
SECOND DRIVING MODE

FIG. 7

MOTOR-DRIVEN POWER STEERING APPARATUS FOR AUTOMOBILES

BACKGROUND OF THE INVENTION

1. Field of the Invention

The present invention generally relates to a motor-driven power steering apparatus for an automobile or a motor vehicle for assisting a driver in steering the vehicle by manipulating a steering wheel. More particularly, the invention is concerned with a motor-driven power steering apparatus which can ensure improved return performance of the steering wheel without involving degradation in the linearity of assist torque control.

2. Description of the Related Art

For a better understanding of the invention, description will first be made of a motor-driven power steering apparatus known heretofore.

Figure 5:
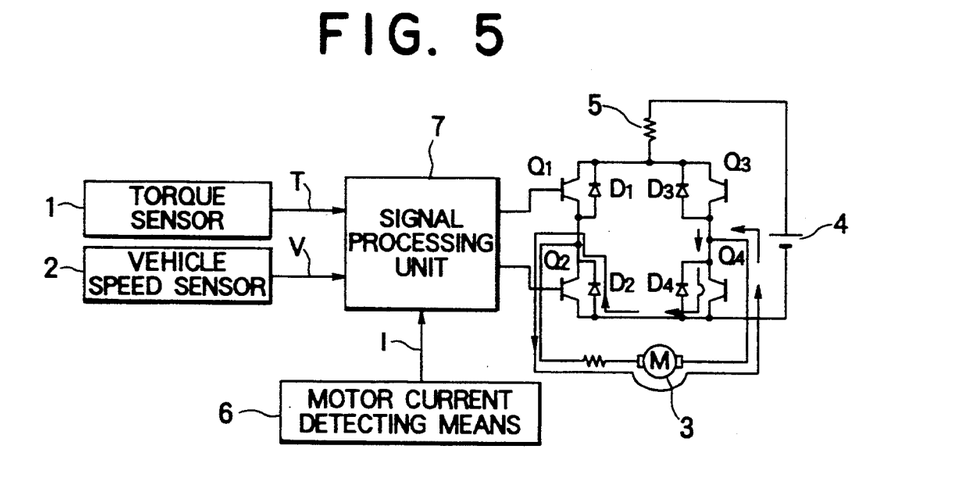
FIG. 5 is a diagram showing schematically a circuit configuration of motor driven power steering apparatus known heretofore.

FIG. 5 is a block diagram showing schematically a configuration of a motor-driven power steering apparatus known heretofore, which is disclosed, for example, in Japanese Unexamined Patent Application Publication No. 35664/1985 (JP-A-60-35664).

Referring to the figure, the power steering apparatus is equipped with a torque sensor 1 for detecting a steering torque T of a steering wheel (not shown) and a vehicle speed sensor 2 for detecting a vehicle speed V. An output shaft of an electric motor 3 is operatively coupled to the steering wheel. The electric motor 3 is electrically connected to a DC power supply source such as an onboard battery 4 via a bridge circuit constituted by two pairs of switching elements such as switching transistors, i.e., a first pair of switching elements $Q_1$ and $Q_4$ and a second pair of switching elements $Q_2$ and $Q_3$ for allowing the motor 3 to be driven selectively in either one of forward and backward directions. Flywheel diodes $D_1$ to $D_4$ are connected across the switching elements $Q_1$ to $Q_4$, respectively. A resistor 5 is inserted-in a current path between the battery 4 and the bridge circuit mentioned above. A motor current detecting means 6 is provided for detecting a current I supplied to the motor 3 through the resistor 5.

The outputs of the torque sensor 1, the vehicle speed sensor 2 and the motor current detecting means 6 are supplied to a signal processing unit 7 which is adapted to control the switching elements $Q_1$; $Q_4$ or $Q_2$; $Q_3$ or the basis of the steering torque T, the vehicle speed V and the motor current I and includes a target value calculating means (not shown) for arithmetically determining or calculating a target current value $I_0$ of the motor current I on the basis of the steering torque T and the vehicle speed V as detected, a control quantity calculating means (not shown) for calculating a control quantity for controlling the motor 3 on the basis of a deviation or difference between the detected motor current I and the target current value $I_0$, a converting means for converting the control quantity mentioned above into PWM (Pulse Width Modulated) signal for controlling the switching elements $Q_1$; $Q_4$ or $Q_2$; $Q_3$ and a driving circuit (not shown) for driving the switching elements in accordance with duty cycles or ratios indicated by the PWM signals.

Next, description will turn to operation of the conventional power steering apparatus shown in FIG. 5.

It is assumed, by way of example, that a driver of the motor vehicle tries to rotate the steering wheel in the rightward (clockwise) direction. In that case, the signal processing unit 7 outputs the driving signal for controlling conduction of the paired switching elements $Q_1$ and $Q_4$ in dependence on the steering torque T and the vehicle speed V as detected by the torque sensor 1 and the vehicle speed sensor 2, respectively. At this juncture, it should be mentioned that there are provided first and second driving modes for controlling the switching elements ($Q_1$; $Q_4$ or $Q_2$; $Q_3$). In the first driving mode, one of the switching elements ($Q_4$ or $Q_3$) in each pair of the switching elements ($Q_1$; $Q_4$ or $Q_2$; $Q_3$) is held in the conducting (ON) state while the other one ($Q_1$ or $Q_2$) is controlled in dependence on the duty cycle of the PWM signal. On the other hand, in the second driving mode, both of the paired switching elements ($Q_1$ and $Q_4$ or $Q_2$ and $Q_3$) are driven in accordance with the duty ratio of the PWM signal.

It is assumed again, by way of example, that the first driving mode is validated and that the switching elements $Q_1$ and $Q_4$ are in charge of controlling the forward rotation of the motor 3 while the switching elements $Q_2$ and $Q_3$ are to control the backward rotation of the motor 3.

When the driver rotates the steering wheel in the clockwise direction (which corresponds to the forward rotation of the motor 3), the signal processing unit 7 outputs correspondingly a forward motor rotation signal. In that case, one $Q_4$ of the paired switching elements $Q_1$ and $Q_4$ is so controlled as to be held constantly in the conducting state while the other one $Q_1$ is repetitively turned on and off in accordance with the duty ratio of the PWM signal.

During a period in which the switching transistor $Q_1$ is turned on, a DC current is supplied to the motor 3 via a current path extending from the battery 4 to the ground through the resistor 5, the switching element $Q_1$, the motor 3 and the switching element $Q_4$, which results in that the motor 3 is rotated in the forward direction (corresponding to the clockwise rotation of the steering wheel). In this manner, the motor 3 generates an output torque of magnitude which depends on the duty ratio of the PWM signal with which the switching element $Q_1$ is turned on and off. The output torque of the motor 3 thus aids the driver in steering the motor vehicle by reducing correspondingly the steering torque T applied by the driver. When the steering torque T applied to the steering wheel is cleared, the steering wheel automatically returns to the neutral or center position under a self-aligning torque.

As can be seen from the above description, the switching element $Q_4$ is held in the conducting (ON) state even when the switching element $Q_1$ is turned off in the first driving mode. Consequently, a closed circuit is formed by the switching element $Q_4$, the fly-wheel diode $D_2$ and the motor 3, as indicated by arrows shown in FIG. 5. Accordingly, when the motor 3 is rotated due to external forces such as a self-aligning torque, a load torque and the like, which act to return the steered road wheels to their original neutral positions, in the state mentioned above (i.e., when the switching element $Q_4$ is in the conducting state with the switching element $Q_1$ being off), a current flows, as indicated by the arrows, which results in that the motor 3 generates a torque which is utterly independent of the torque control. In this conjunction, it should be noted that no means is provided for turning off the switching element $Q_4$. Consequently, the current flowing through the motor 3 in the state mentioned above can not be controlled.

The torque generated by the motor 3 independent of the power steering control, as described above, acts as a regenerative braking force when the steering wheel returns to the center position under the self-aligning torque and thus reduces the returning speed of the steering wheel.

For solving the problem mentioned above, it is conceivable to validate the second driving mode to thereby turn on/off the switching element $Q_4$ together with the switching element $Q_1$ in accordance with the duty ratio of the PWM signal. In that case, the frequency of the PWM signal will necessarily increase. Consequently, under the influence of inductance of the motor 3, linearity in the relation between the duty ratio of the PWM signal and the output torque of the motor 3 is degraded whereby the control performance of the power steering apparatus is lowered.

Next, differences in the return characteristic of the steering wheel and the linearity due to difference in the output torque of the motor 3 between the first and second driving modes will be elucidated below in detail.

Figure 6:
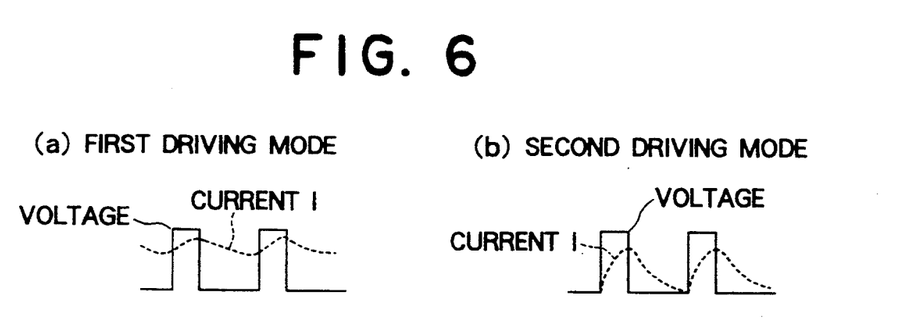
FIGS. 6A and 6B are waveform diagrams illustrating motor currents in the first and second driving modes, respectively.
Figure 6A:
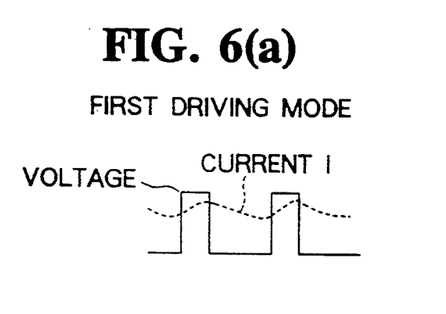
Figure 6B:
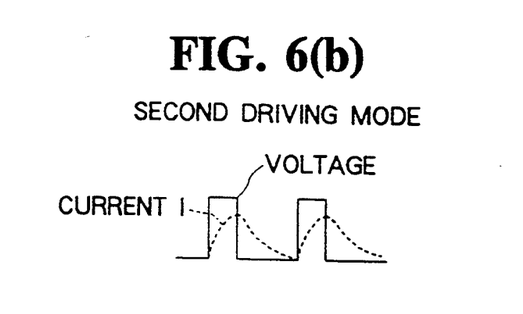

FIGS. 6A and 6B are waveform diagrams illustrating voltages (solid-line curve) and currents I (broken-line curve) of the motor 3 in the first and second driving modes, respectively.

As can be seen by comparing the waveforms shown in the figures, the motor current I in the first driving mode differs from that in the second driving mode. Such a difference in the motor current I can be ascribed to a difference in the on/off time constant due to a difference in ohmic resistance, for example, of the switching element $Q_4$ between the first and second driving modes. More specifically, when inductance of the motor 3 is assumed as being constant, the time constant of the motor circuit including the resistance, the switching element $Q_4$ and the motor 3 is in reverse proportion to the on/off resistance of the switching element $Q_4$. Thus, the time constant assumes a large value in the first driving mode in which the switching element $Q_4$ is constantly held in the on-state while the time constant is small in the second driving mode where the switching element $Q_4$ is turned on and off.

For the reason mentioned above, the time constant for the regenerative brake current of the motor 3 when the switching element $Q_4$ is off in the first driving mode is large, as is shown in FIG. 6A. This means that a long time is taken for the motor current I to attenuate, although a high linearity can be assured between the duty ratio of the SW signal and the torque generated by the motor 3. Consequently, the return characteristic of the steering wheel is degraded.

On the other hand, in the second driving mode shown in FIG. 6B, the above-mentioned time constant is small. Consequently, the motor current I changes rapidly when the switching elements $Q_1$ and $Q_4$ are turned off. In other words, the motor current I tends to decrease to zero immediately in response to a change of the PWM signal to the off-level. However, because of poor linearity, the control of the motor current I or output torque to a desired value becomes unstable particularly in a control region where the current 1 is large, bringing about fluctuations in the output torque as well as generation of acoustic control noise by the motor 3.

Figure 7:
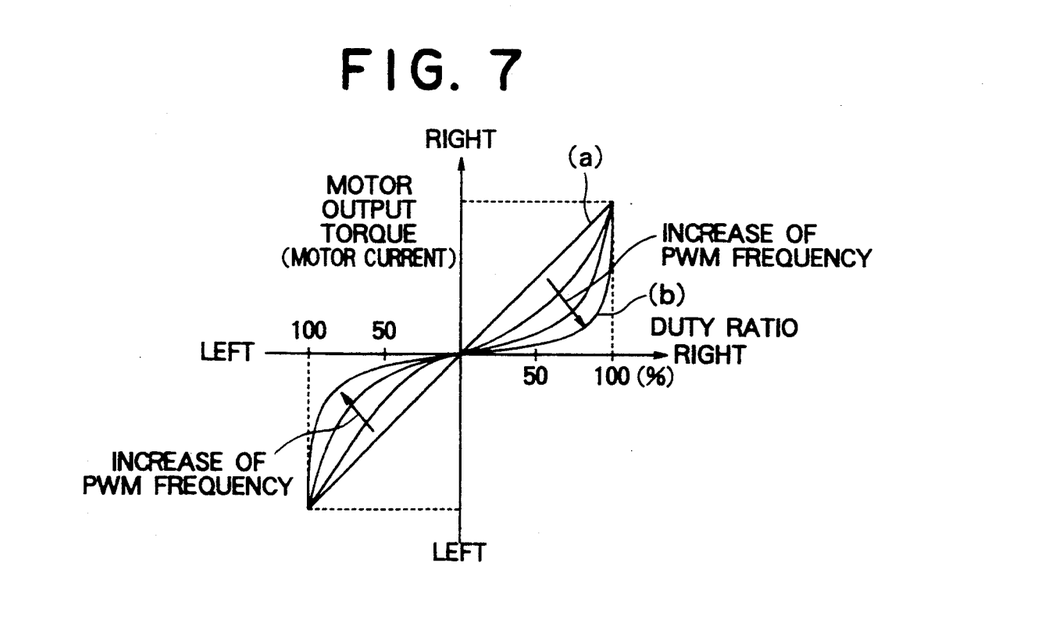
FIG. 7 is a characteristic diagram illustrating characteristically relations of the motor output torque (motor current I) to duty ratios of a PWM signal.

FIG. 7 is a characteristic diagram illustrating relation of the motor output torque (motor current I) to the duty ratio of the PWM signal, wherein the output torque generated when the steering wheel is rotated rightwardly or clockwise is shown in the first quadrant with the output torque generated upon leftward or counterclockwise rotation of the steering wheel being shown in the third quadrant. Arrows shown in FIG. 7 indicate the direction in which the frequency of the PWM frequency increases. It will be seen from this figure that the linearity is degraded when the driving mode is changed over from the first driving mode (a) to the second driving mode (b).

More specifically, it is apparent from FIG. 7 that the output torque characteristic is represented substantially by a linear function of the duty ratio (i.e., the output torque characteristic exhibits high linearity) in the first driving mode represented by a graph (a). On the other hand, in the second driving mode represented by graphs (b), the output torque characteristic takes a curvilinear form and degradation in the linearity becomes more remarkable as the frequency of the PWM signal increases.

Further, in the second driving mode, ripple components of the motor current I generated upon turning-on/off of the switching elements $Q_1$ and $Q_4$ become more remarkable when compared with the motor current in the second driving mode, resulting in generation of radio noise as well as heat generation of the switching elements $Q_1$ to $Q_4$ and the ripple suppressing capacitor.

As is obvious from the foregoing discussion, the power steering apparatus known heretofore in which the switching elements $Q_1$, $Q_4$ are controlled only in one of the first and second driving modes is disadvantageous in that the return performance of the steering wheel is poor in the first driving mode and that the linearity of the PWM control is degraded in the second driving mode.

SUMMARY OF THE INVENTION

In the light of the state of the art described above, it is an object of the present invention to provide a motor-driven type power steering apparatus for a motor vehicle in which high linearity can be realized in the relation between the motor output torque and the duty ratio of the PWM signal and in which the steering wheel return performance can be improved.

In view of the above and other objects which will become apparent as description proceeds, there is provided, according to a general aspect of the present invention, a motor-driven power steering apparatus for a motor vehicle, which apparatus comprises a torque sensor for detecting a steering torque applied to a steering wheel, a vehicle speed sensor for detecting speed of the motor vehicle, an electric motor for assisting manipulation of the steering wheel, two pairs of switching elements connected in the form of a bridge circuit together with the electric motor for allowing the motor to rotate selectively in either one of forward and backward directions, a motor current detecting means for detecting the current flowing through the electric motor, and a signal processing unit for driving the switching elements on the basis of the steering torque, the vehicle speed and the motor current, wherein the signal processing unit includes a steering wheel return decision means for deciding whether or not the steering wheel of the motor vehicle is in a return state in which the steering wheel is returned to a center position, a target current value arithmetic means for arithmetically determining a target current value of the motor current on the basis of the steering torque and the vehicle speed, a control quantity arithmetic means for arithmetically determining a control quantity for the electric motor in dependence on a deviation of the motor current from the target Current value, a selecting means for generating first and second control quantities corresponding to first and second driving modes, respectively, on the basis of the control quantity outputted from the control quantity arithmetic means and for selecting one of the first and second control quantities in dependence on the result of decision as to the return state of the steering wheel, a conversion means for converting the first and second control quantities into first and second PWM duty ratios, respectively, for controlling the switching elements, and a driving circuit for driving the switching elements on the basis of the first or second PWM duty ratio, wherein the selecting means generates the first control quantity corresponding to the first driving mode when the steering wheel is decided as not being in the return state while generating the second control quantity corresponding to the second driving mode when the steering wheel is decided as being in the return state, and wherein the driving circuit responds to the first PWM duty ratio to thereby hold constantly the switching element in each while turning on and off the other switching element in each pair with the first PWM duty ratio, while the driving circuit responds to the second PWM duty ratio by turning on and off both of the switching elements in each pair with the second PWM duty ratio.

With the arrangement of the power steering apparatus described above, high linearity can be maintained in the relation between the motor output torque and the PWM duty ratio selected for the first driving mode in the normal manipulation of the steering wheel, whereby a smooth steering torque control can be realized with unwanted radio noise and heat generation of circuit components being suppressed to a minimum. On the other hand, upon return of the steering wheel to the neutral or center position under a self-aligning torque, regenerative braking action of the motor can be suppressed through the control in the second driving mode. Thus, the steering-wheel manipulation performance can significantly be improved.

In a preferred embodiment of the invention, the steering-wheel return state decision means determines the state of the steering wheel on the basis of a deviation of the motor current from the target current value and outputs the state of the steering wheel as determined.

With this arrangement, the steering-wheel return characteristic can be improved with a simplified and inexpensive circuit configuration.

It is preferred that the steering-wheel return state decision means presumes that the steering wheel is in the return state when the motor current exceeds the target current value by a predetermined value.

By virtue of this feature, the steering-wheel return state can be determined with high accuracy and reliability.

Further, the conversion means may include correcting means for correcting difference between the first and second PWM duty ratios upon change-over of the first and second driving modes.

Owing to this arrangement, the linearity of the torque control can be improved even in the second driving mode.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Now, the present invention will be described in detail in conjunction with preferred or exemplary embodiments thereof by reference to the drawings.

Embodiment 1

Figure 1:
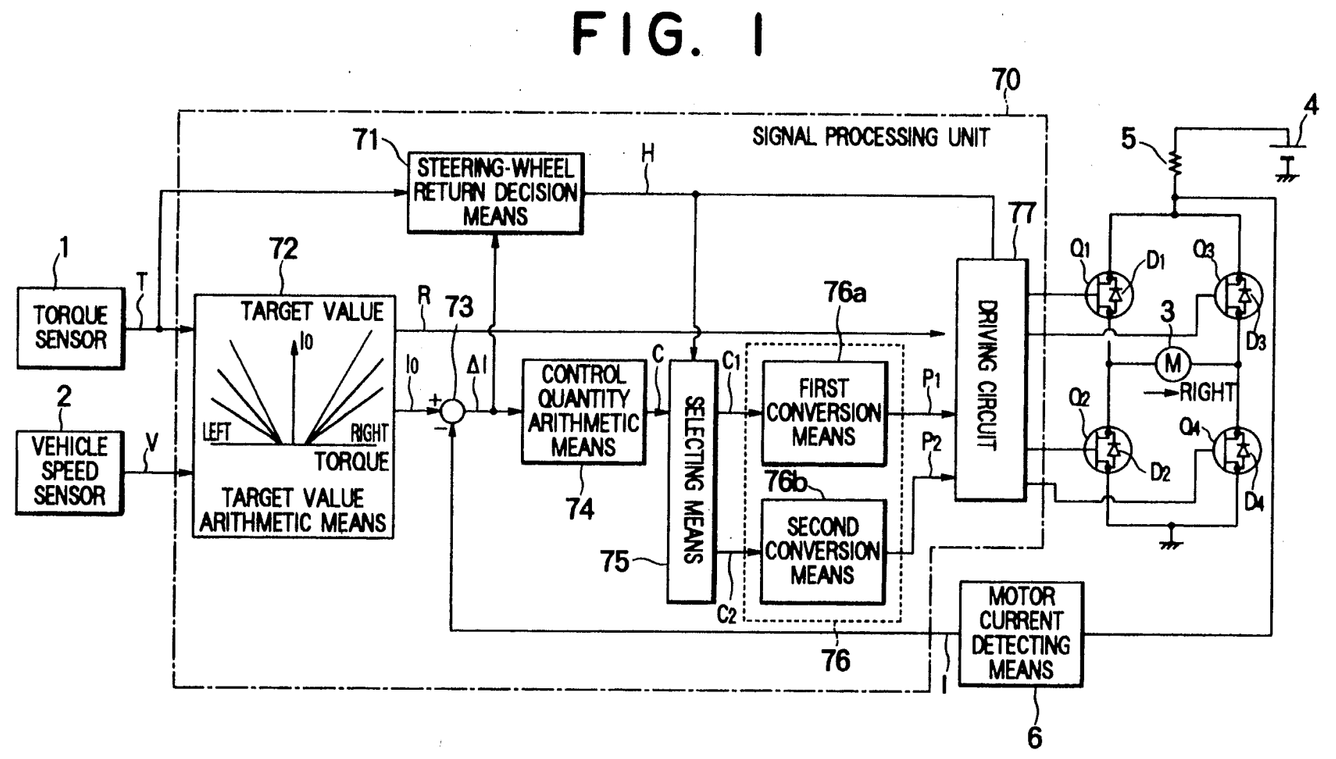
FIG. 1 is a block diagram showing an arrangement of a motor-driven type power steering apparatus according to a first embodiment of the invention.

FIG. 1 is a block diagram showing an arrangement of the motor-driven type power steering apparatus according to a first embodiment of the invention with a part of the apparatus being shown in a circuit diagram. In the figure, the reference symbols 1 to 6, $Q_1$ to $Q_4$ and $D_1$ to $D_4$ denote parts or components same as or equivalent to those described hereinbefore by reference to FIG. 5. Further, it is to be understood that the reference symbols T, V and I have the same meanings as those described previously.

Referring to FIG. 1, a signal processing unit 70, which functionally corresponds to the one designated by the reference numeral 7 in FIG. 5, includes a steering-wheel return decision means 71, a target current value arithmetic means 72, a subtractor 73, a motor control quantity arithmetic means 74, a selecting means 75, a conversion means 76 and a driving circuit 77.

The steering-wheel return decision means 71 serves for deciding whether the steering wheel is in the return state (i.e., the steering wheel is to be rotated back to the neutral or center position). When the return state of the steering wheel is determined by the steering-wheel return decision means 71 on the basis of, for example, the steering torque T detected by the torque sensor 1 and a current deviation or difference (mentioned below), the steering-wheel return decision means 71 outputs a decision result signal H indicative of the return state of the steering wheel.

The target current value arithmetic means 72 serves for arithmetically determining or calculating a target current value $I_0$ of the motor current on the basis of the steering torque T and the vehicle speed V to thereby generate a signal representing the target current value $I_0$ and a rotating direction command R indicating the direction in which the motor 3 is to be rotated. The target current value $I_0$ is inputted to the subtractor 73 which subtracts the actually measured value of the motor current I from the target current value $I_0$ to thereby determine the current deviation $\Delta I$ mentioned above. On the basis of the this current deviation $\Delta I$, the control quantity arithmetic means 74 arithmetically determines a control quantity C for controlling the motor 3 through a PID (proportional-plus-integral-plus-differential) control. The current deviation $\Delta I$ is also inputted to the steering-wheel return decision means 71 together with the steering torque T.

The selecting means 75 generates a first control quantity C1 and a second control quantity C2 corresponding to the first and second driving modes, respectively, on the basis of the control quantity C outputted from the control quantity arithmetic means 74 and selects one of the control quantities C1 and C2 in dependence of the decision result of the steering-wheel return decision means 71. Unless the decision result H indicating the steering-wheel return state is outputted from the decision means 71, the selecting means 75 generates the first control quantity C1 corresponding to the first driving mode, while the selecting means 75 generates the second control quantity C2 corresponding to the second driving mode when the decision result H is outputted.

Here, it is to be noted that there are following relationships between control quantities C, C1 and C2:

$$C=C1=C2$$

However, the first and second control quantities C1 and C2 have a piece of information representative of the first driving mode and the second driving mode, respectively.

Figure 2:
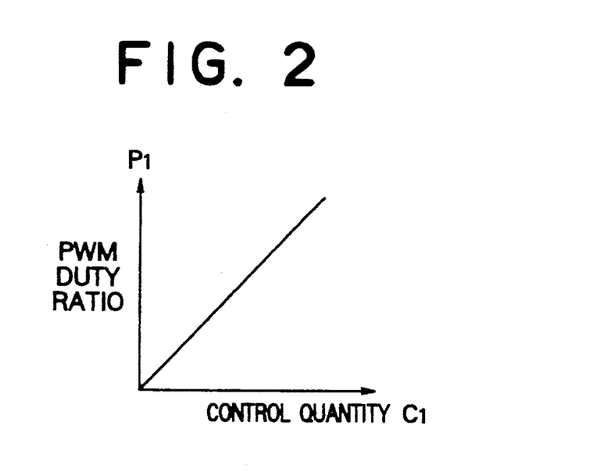
FIG. 2 is a view illustrating graphically a conversion characteristic of a first conversion means for determining a first PWM duty ratio in a first driving mode in dependence on a first control quantity.
Figure 3:
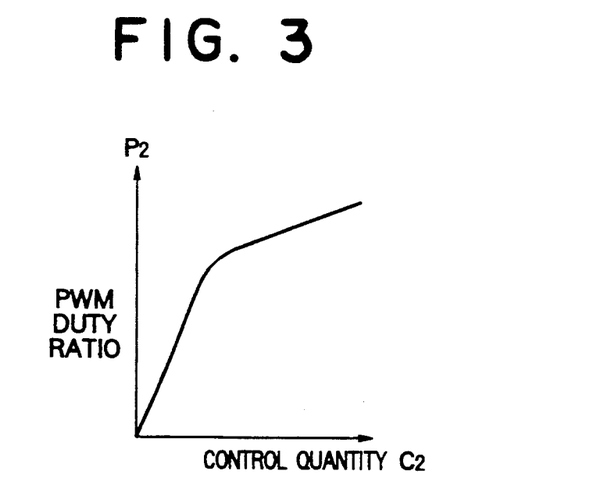
FIG. 3 is a view similar to FIG. 2 and shows a conversion characteristic of a second conversion means for determining a second PWM duty ratio for a second driving mode in dependence on a second control quantity.

In this embodiment, P1 and P2 are determined by looking up the map as illustrated in FIGS. 2 and 3, but they can be determined by use of a function. For example, P1 can be determined from a linear function having variables T and V, and P2 can be determined from a combination of two or more linear functions.

The conversion means 76 serves for converting the first and second control quantities C1 and C2 into first and second PWM duty ratios P1 and P2 for the PWM signal for controlling the switching elements $Q_1$; $Q_4$ or $Q_2$; $Q_3$ and is comprised of first conversion means 76a for converting the first control quantity C1 to the first PWM duty ratio P1 and a second conversion means 76b for converting the second control quantity C2 to the second PWM duty ratio P2. At this juncture, it should be mentioned that the conversion means 76 should preferably include a correcting means for smoothing change-over of the first and second PWM duty ratios P1 and P2 to each other upon changing over of the first and second driving modes. The correcting means may be incorporated in the conversion means 76b corresponding to the second driving mode in which the linearity between the duty ratio of the PWM signal and the motor torque is degraded as described hereinbefore.

The driving circuit 77 drives the switching elements such as the switching elements $Q_1$ and $Q_4$ on the basis of the first PWM duty ratio P1 or the second PWM duty ratio P2 on the assumption that the steering torque for rotating the steering wheel in the clockwise direction. More specifically, the driving circuit 77 responds to the first PWM duty ratio P1 to thereby turn on one (e.g. $Q_4$) of the paired switching elements ($Q_1$ and $Q_4$) and hold it in the conducting state while turning on and off the other switching element $Q_1$ in accordance with the duty ratio of the first PWM duty ratio P1. On the other hand, in response to the second PWM duty ratio P2, the driving circuit 77 drives both the paired switching elements $Q_1$ and $Q_4$ in accordance with the first PWM duty ratio P2.

FIG. 2 is a view illustrating graphically a conversion characteristic of the first conversion means 76a for determining the first PWM duty ratio P1 in the first driving mode in dependence on the first control quantity C1. As previously pointed out by reference to FIG. 7, the torque control for the motor 3 can enjoy a good linearity in the first driving mode. Accordingly, the above-mentioned conversion characteristic can be represented at least approximately by a linear function.

FIG. 3 is a view similar to FIG. 2 and shows a conversion characteristic of the second conversion means 76b for determining the second PWM duty ratio P2 for the second driving mode in dependence on the second control quantity C2. In the second driving mode, the torque control for the motor 3 is poor in the linearity, as described hereinbefore by reference to FIG. 7. Accordingly, the conversion characteristic of the second conversion means 76b is so determined as to cancel out the non-linearity of the motor torque control characteristic.

Figure 4:
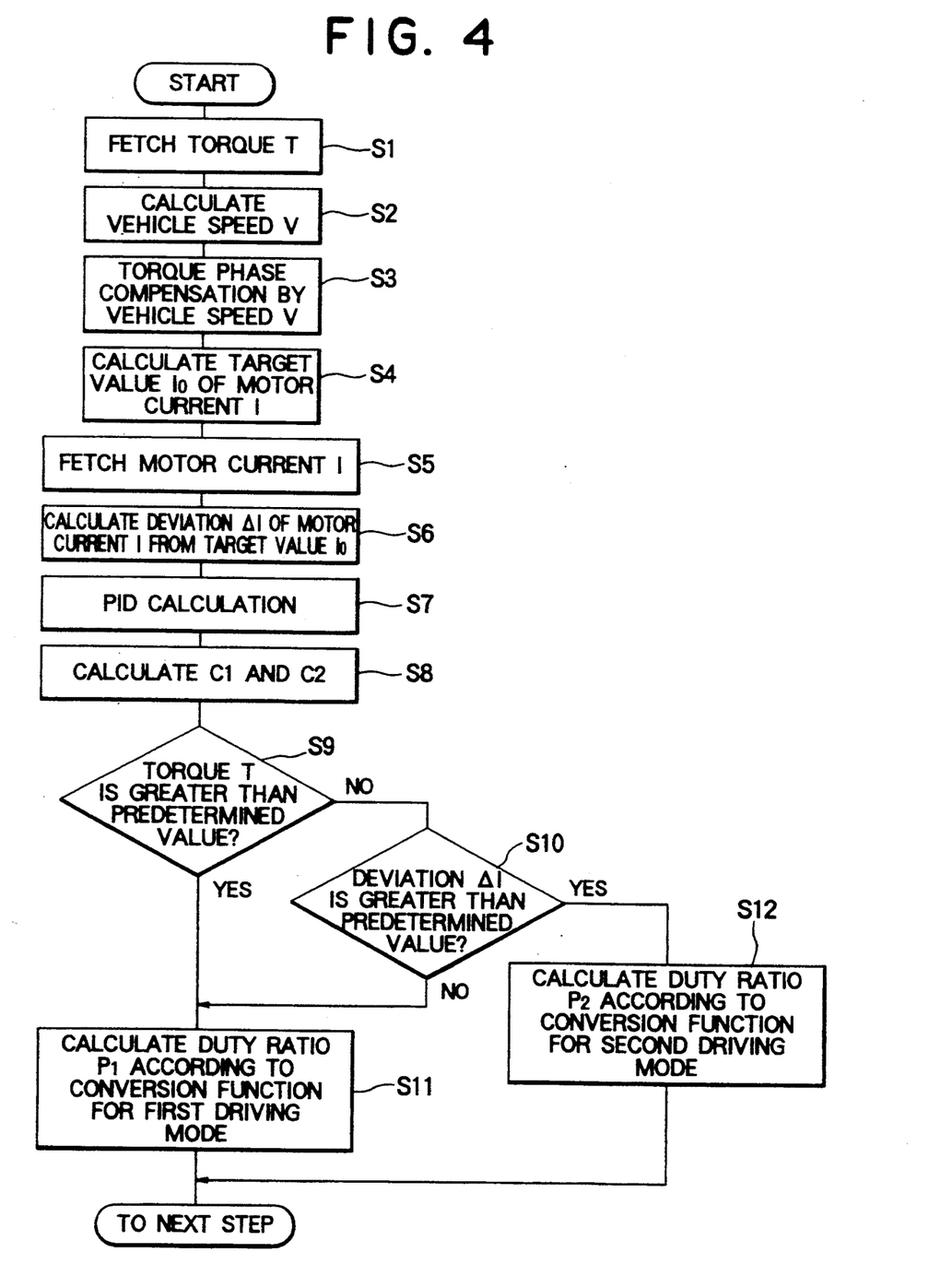
FIG. 4 is a flow chart for illustrating operation of the power steering apparatus shown in FIG. 1.

Next, description will turn to operation of the power steering apparatus according to the instant embodiment of the invention by reference to FIGS. 2 and 3 along with a flow chart of FIG. 4.

At first, in a step S1, the target current value arithmetic means 72 fetches the steering torque T from the output of the torque sensor 1. In a step S2, the target current value arithmetic means 72 fetches the vehicle speed signal from the output of the vehicle speed sensor 2 to calculate the vehicle speed V. In a step S3, the steering torque T undergoes a phase compensation in dependence on the vehicle speed V. In a step S4, the target current value arithmetic means 72 determines the direction R of rotation of the motor 3 as well as the target current value $I_0$ of the motor current for assisting the steering. More specifically, when the steering torque T changes at a high rate as a function of time, the target current value $I_0$ is set to a large value by taking into account a phase advance of the steering torque T. On the other hand, in the running state of the automobile where the vehicle speed V is high, the target current value $I_0$ is set to a small value because the assist torque may be small in this case.

Subsequently, in a step S5, the motor current I supplied from the motor current detecting means 6 is fetched and subtracted from the target current value $I_0$ by the subtractor 73 to thereby determine the current deviation $\Delta I$ (step S6).

Further, the control quantity arithmetic means 74 determines the control quantity C for controlling the motor 3 through a PID (proportional-pulse-integral-plus-differential) control on the basis of the current deviation $\Delta I$ (steps S7 and S8). The control quantity C for the motor 3 is given in terms of the duty ratio of the PWM signal for driving the switching elements $Q_1$ and/or $Q_4$.

The steering-wheel return decision means 71 decides whether or not the steering torque T is greater than a predetermined value (e.g., 10 Kgf-cm) in a step S9. When the result of this decision step S9 is negative (NO), then a step S10 is executed to determine whether or not the current deviation $\Delta I(=I_0-I)$ is greater than a predetermined value (e.g., 3 amperes).

When it is decided that the steering torque T is greater than the predetermined value in the step S9 or alternatively the current deviation ΔI is smaller than the predetermined value in the step S10, the steering-wheel return decision means 71 determines that the steering wheel is not in the return state but in the normal steering state. Consequently, the steering-wheel return decision means 71 does not generate the decision result H indicating the steering-wheel return state.

Unless the decision result H is generated, the selecting means 75 generates the first control quantity C1 for the first driving mode on the basis of the control quantity C. In response, the first conversion means 76a incorporated in the conversion means 76 determines the first PWM duty ratio P1 on the basis of the first control quantity C1 in accordance with the converting function (FIG. 2) for the first driving mode in a step S11, whereby the corresponding PWM signal is inputted to the driving circuit 77.

Thus, the switching elements $Q_1$ and $Q_4$ are driven in the first driving mode. More specifically, one ($Q_4$) of the switching elements $Q_1$ and $Q_4$ is constantly held in the conducting state while the other switching element ($Q_1$) is driven (i.e., turned on and off) in accordance with the first PWM duty ratio P1.

In this manner, in the case of the normal steering state, the power steering operation enjoying a high linearity in the torque control for the motor 3 can be realized, whereby fluctuation in the assist torque, generation of audible noise of the motor 3 and radio noise as well as heat generation of the circuit components can be suppressed satisfactorily.

On the other hand, when it is decided in the step S9 that the steering torque T is smaller than the predetermined value, it is then determined in step S10 whether the current deviation ΔI is greater than the predetermined value. The steering-wheel return decision means 71 then determines that the steering wheel is in the return state, whereby the decision result H indicating the steering-wheel return state is generated.

In general, decrease of the steering torque T as applied by the driver below a predetermined value indicates a high probability of return of the steering wheel to the neutral or center position. Besides, the current deviation ΔI which is greater than a predetermined value, i.e., the motor current I greater than the target current value $I_0$ by a predetermined value, equally indicates a high probability of return of the steering wheel and hence regenerative mode of the motor 3. Accordingly, when both conditions mentioned above are satisfied, it can reasonably be regarded that the steering wheel is in the return state.

When the decision result H is generated by the steering-wheel return decision means 71, the selecting means 75 changes over the first driving mode to the second driving mode for improving the return performance of the steering wheel. In the second driving mode, the second control quantity C2 is generated on the basis of the control quantity C. Thus, the second conversion means 76b incorporated in the conversion means 76 determines the second PWM duty ratio P2 in accordance with the function for conversion illustrated in FIG. 3 (step S12). The second PWM duty ratio P2 thus determined is inputted to the driving circuit 77.

Consequently, the switching elements $Q_1$ and $Q_4$ are driven with the second PWM duty ratio P2 in the second driving mode. In other words, both the paired switching elements $Q_1$ and $Q_4$ are turned on and off in accordance with the second PWM duty ratio P2. Thus, in the steering-wheel return state, the follow-up characteristic of the motor current I is improved, whereby the assist torque generated by the motor 3 can be controlled accurately to a demanded value, as a result of which there can be realized the power steering which can enjoy excellent steering-wheel return performance.

The selecting means 75 includes a timer. When the timer indicates the lapse of a predetermined time after the change-over to the second driving mode, the selecting means 75 decides that the steering-wheel return operation has been completed and automatically changes over the second driving mode to the first driving mode in order to restore the high linearity of the assist torque control. The conditions for changing over the driving modes should preferably be so set as to conform with the specifications of the automobile in which the power steering apparatus is actually installed by selecting the reference level for the change-over of the driving modes while taking into consideration other factors such as hysteresis involved in the control so that unwanted hunting or the like phenomenon can be suppressed.

Since the conversion means 76 can select appropriately the first PWM duty ratio P1 or the second PWM duty ratio P2 upon change-over to the first or second driving mode, the steering wheel can positively be protected against shock or the like undesirable phenomena without the need of paying attention to the change-over timing based on the decision result H of the steering-wheel return decision means 71.

As will now be understood from the foregoing description, according to the teachings of the invention incarnated. In the illustrated embodiment, there can be realized a silent and smooth torque control for the steering assist motor owing to high linearity between the first PWM duty ratio P1 and the motor current I (motor output torque) in the first driving mode for the normal steering operation with unwanted generation of radio noise and heat being suppressed to a minimum, while in the second driving mode for return of the steering wheel to the center position under the selfaligning torque, the regenerative braking action of the motor 3 can be suppressed by validating the second driving mode.

In the foregoing description, it has been assumed that the motor 3 is rotated in the forward or rightward direction in the first and second driving modes by controlling the switching elements $Q_1$ and $Q_4$, it goes without saying that the similar torque control can be accomplished equally when the motor 3 is rotated in the leftward direction by controlling similarly the switching elements $Q_2$ and $Q_3$.

Embodiment 2

In the case of the first embodiment, the steering-wheel return decision means 71 decides the steering-wheel return state on the basis of the steering torque T and the current deviation ΔI. However, similar effects can be achieved by estimating the rotation speed (rpm) of the motor 3 on the basis of either one of the steering torque T or the current deviation ΔI or alternatively on the basis of an observer which is a calculation method for calculating a motor generating voltage Em and a rotational number (number of revolutions per minute) Nm of the motor based on a motor resistance R, a motor current Im (i.e., the current supplied to the motor), and a motor drive voltage Vm (i.e., the voltage supplied to the motor). Namely, the motor drive voltage Vm and the motor generating voltage Em are expressed as follows:

$$Vm = Im \times R + Em \quad (1)$$

$$Em = K \times Nm \quad (2)$$

where K is a coefficient. In equation (1) above, Vm and Im are first determined or detected, and R is estimated to thereby determine Em. From thus determined or estimated Em, Nm is obtained using equation (2) above.

Embodiment 3

According to the third embodiment of the invention, it is proposed to detect straight-forwardly the steering wheel return state by using a steering-wheel angle sensor or a motor rotation speed sensor to thereby generate the decision result H on the basis of the outputs of these sensors.

Embodiment 4

In the case of the first embodiment, the correcting means is incorporated in the conversion means 76 for the purpose of smoothing the change-over of the driving modes by correcting the PWM duty ratio. However, the correcting means may be omitted. In that case, although degradation of linearity in the torque control in the second driving mode can not be evaded, the steering-wheel return performance can be improved.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A motor-driven power steering apparatus for a motor vehicle, comprising:
    a torque sensor for detecting a steering torque of a steering wheel;
    a vehicle speed sensor for detecting a speed of said motor vehicle;
    an electric motor for assisting manipulation of said steering wheel;
    two pairs of switching elements connected in the form of a bridge circuit together with said electric motor for allowing said electric motor to rotate selectively in either one of forward and backward directions;
    motor current detecting means for detecting the current flowing through said electric motor; and
    a signal processing unit for driving said switching elements on the basis of said steering torque, said vehicle speed and said motor current;
    wherein said signal processing unit includes:
        steering wheel return decision means for deciding whether the steering wheel of said motor vehicle is in a return state in which said steering wheel is to be returned to a center position;
        target current value arithmetic means for arithmetically determining a target current value of said motor current on the basis of said steering torque and said vehicle speed;
        control quantity arithmetic means for arithmetically determining a control quantity for said electric motor in dependence on deviation of said motor current from said target current value;
        selecting means for generating first and second control quantities corresponding to first and second driving modes, respectively, on the basis of said control quantity and selecting one of said first and second control quantities in dependence on the return state of said steering wheel;
        conversion means for converting said first and second control quantities into first and second PWM duty ratios, respectively, for said switching elements; and
        a driving circuit for driving said switching elements on the basis of said first or second PWM duty ratio;
    wherein said selecting means generates said first control quantity corresponding to said first driving mode when said steering wheel is judged as not being in said return state while generating said second control quantity corresponding to said second driving mode when said steering wheel is judged as being in said return state; and
    wherein said driving circuit responds to said first PWM duty ratio to thereby hold constantly one switching element in each pair in conducting state while turning on and off the other switching element in each pair according to said first PWM duty ratio, while said driving circuit responds to said second PWM duty ratio by turning on and off simultaneously both of said switching elements in each pair according to said second PWM duty ratio.

2. A motor-driven power steering apparatus according to claim 1,
    wherein said conversion means includes correcting means for correcting difference between said first and second PWM duty ratios upon change-over of the driving mode between said first and second driving modes.

3. A motor-driven power steering apparatus according to claim 1,
    wherein said steering-wheel return state decision means determines the state of said steering wheel on the basis of deviation of said motor current from said target current value and outputs the determined state of said steering wheel as the result of said determination.

4. A motor-driven power steering apparatus according to claim 3,
    wherein said conversion means includes correcting means for correcting difference between said first and second PWM duty ratios upon change-over of the driving mode between said first and second driving modes.

5. A motor-driven power steering apparatus according to claim 3,
    wherein said steering-wheel return state decision means determines that said steering wheel is in the return state when said motor current exceeds said target current value by a predetermined value.

6. A motor-driven power steering apparatus according to claim 5,
    wherein said conversion means includes correcting means for correcting a difference between said first and second PWM duty ratios upon change-over of the driving mode between said first and second driving modes.

* * * * *